US 9,551,283 B2

(12) United States Patent
Crothers et al.

(10) Patent No.: US 9,551,283 B2
(45) Date of Patent: Jan. 24, 2017

(54) SYSTEMS AND METHODS FOR A FUEL PRESSURE OSCILLATION DEVICE FOR REDUCTION OF COHERENCE

(71) Applicant: General Electric Company, Schenectady, NY (US)

(72) Inventors: Sarah Lori Crothers, Greenville, SC (US); James Scott Flanagan, Greeville, SC (US); Lewis Berkley Davis, Jr., Niskayuna, NY (US)

(73) Assignee: General Electric Company, Schenectady, NY (US)

( * ) Notice: Subject to any disclaimer, the term of this patent is extended or adjusted under 35 U.S.C. 154(b) by 148 days.

(21) Appl. No.: 14/316,616

(22) Filed: Jun. 26, 2014

(65) Prior Publication Data

US 2015/0377138 A1 Dec. 31, 2015

(51) Int. Cl.
*F02C 1/00* (2006.01)
*F02C 7/22* (2006.01)

(52) U.S. Cl.
CPC ........... *F02C 7/22* (2013.01); *F05D 2260/964* (2013.01); *F23R 2900/00013* (2013.01)

(58) Field of Classification Search
CPC ................. F23R 3/46; F23R 3/38; F23R 3/56; F23R 2900/00013
See application file for complete search history.

(56) References Cited

U.S. PATENT DOCUMENTS

| 2,072,826 | A |   | 3/1937  | Riley |
|-----------|---|---|---------|-------|
| 4,044,553 | A | * | 8/1977  | Vaught ...................... F23R 3/30 |
|           |   |   |         | 239/402.5 |
| 4,620,414 | A | * | 11/1986 | Christ ...................... F02C 5/04 |
|           |   |   |         | 60/39.34 |

(Continued)

FOREIGN PATENT DOCUMENTS

| EP | 1605205 | 12/2005 |
| EP | 1632718 | 3/2006  |
| EP | 2031192 | 3/2009  |

OTHER PUBLICATIONS

Richards, Geo et al., "Effect of Fuel System Impedance Mismatch on Combustion Dynamics," ASME Turbo Expo 2005: Power for Land, Sea, and Air, vol. 2, Paper No. GT2005-68386, Reno, Nevada, Jun. 6-9, 2005, 11 pgs.

(Continued)

*Primary Examiner* — Gerald L Sung
(74) *Attorney, Agent, or Firm* — Fletcher Yoder, P.C.

(57) ABSTRACT

A system with a gas turbine engine is provided. The gas turbine engine includes a first combustor comprising a first fuel nozzle, a second combustor comprising a second fuel nozzle, and a first fuel pressure oscillation system. The first fuel pressure oscillation system includes a first rotary device coupled to a first fuel circuit. The first fuel circuit is disposed along a first fuel passage leading to the first fuel nozzle. The first rotary device is configured to generate a first fuel pressure oscillation through the first fuel nozzle. The gas turbine engine also includes a second fuel pressure oscilla- (Continued)

tion system having a second rotary device coupled to a second fuel circuit. The second fuel circuit is disposed along a second fuel passage leading to the second fuel nozzle, and the second rotary device is configured to generate a second fuel pressure oscillation through the second fuel nozzle.

20 Claims, 2 Drawing Sheets

(56) References Cited

U.S. PATENT DOCUMENTS

| | | | |
|---|---|---|---|
| 4,677,822 A * | 7/1987 | Iizuka | F23R 3/26 60/39.23 |
| 4,724,670 A * | 2/1988 | Greer | F23R 3/56 415/77 |
| 4,901,694 A * | 2/1990 | Sakita | F01C 1/077 123/234 |
| 5,159,807 A * | 11/1992 | Forestier | F23R 3/46 60/39.23 |
| 5,345,758 A * | 9/1994 | Bussing | B01J 3/08 60/39.38 |
| 5,657,631 A * | 8/1997 | Androsov | F23D 11/402 239/403 |
| 5,943,866 A | 8/1999 | Lovett et al. | |
| 6,164,055 A | 12/2000 | Lovett et al. | |
| 6,625,569 B2 | 9/2003 | James et al. | |
| 6,820,431 B2 | 11/2004 | McManus et al. | |
| 7,278,266 B2 | 10/2007 | Taware et al. | |
| 7,337,057 B2 | 2/2008 | Norman et al. | |
| 7,451,601 B2 | 11/2008 | Taware et al. | |
| 7,503,177 B2 | 3/2009 | Bland et al. | |
| 7,523,614 B2 | 4/2009 | Tanimura et al. | |
| 7,578,130 B1 | 8/2009 | Kraemer et al. | |
| 7,620,461 B2 | 11/2009 | Frederick, II et al. | |
| 7,693,147 B2 | 4/2010 | Williams et al. | |
| 7,739,999 B2 | 6/2010 | Kang et al. | |
| 7,743,599 B2 | 6/2010 | Taware et al. | |
| 7,805,922 B2 | 10/2010 | Bland | |
| 7,908,072 B2 | 3/2011 | Tonno et al. | |
| 7,997,083 B2 | 8/2011 | Meadows et al. | |
| 8,112,216 B2 | 2/2012 | Davis, Jr. et al. | |
| 8,322,140 B2 | 12/2012 | Kim et al. | |
| 8,966,909 B2 | 3/2015 | Crothers et al. | |
| 2005/0278108 A1 | 12/2005 | Norman et al. | |
| 2006/0041368 A1 | 2/2006 | Williams et al. | |
| 2006/0042261 A1 | 3/2006 | Taware et al. | |
| 2006/0254279 A1 | 11/2006 | Taware et al. | |
| 2007/0180831 A1 | 8/2007 | Bland | |
| 2008/0010966 A1 | 1/2008 | Taware et al. | |
| 2009/0005951 A1 | 1/2009 | Frederick et al. | |
| 2009/0005952 A1 | 1/2009 | Tonno et al. | |
| 2009/0063003 A1 | 3/2009 | Meadows et al. | |
| 2010/0170254 A1 | 7/2010 | Venkataraman et al. | |
| 2010/0192578 A1 | 8/2010 | Singh et al. | |
| 2010/0232930 A1 * | 9/2010 | Gregory | F02C 3/14 415/115 |
| 2010/0236214 A1 * | 9/2010 | Wiedenhoefer et al. | F23R 7/00 60/39.39 |
| 2010/0313568 A1 | 12/2010 | Davis, Jr. et al. | |
| 2011/0072826 A1 | 3/2011 | Narra et al. | |
| 2011/0162370 A1 | 7/2011 | Kim et al. | |
| 2011/0179795 A1 | 7/2011 | Johnson et al. | |
| 2012/0006029 A1 | 1/2012 | Bilbao et al. | |
| 2013/0000312 A1 | 1/2013 | Kodukulla et al. | |
| 2013/0014514 A1 | 1/2013 | Romig et al. | |
| 2014/0053528 A1 | 2/2014 | Crothers et al. | |
| 2014/0060063 A1 | 3/2014 | Boardman et al. | |
| 2014/0109587 A1 | 4/2014 | Crothers et al. | |
| 2014/0137561 A1 | 5/2014 | Crothers et al. | |
| 2014/0238026 A1 | 8/2014 | Boardman et al. | |
| 2014/0238033 A1 | 8/2014 | Crothers et al. | |
| 2014/0238041 A1 | 8/2014 | Crothers et al. | |
| 2014/0260299 A1 | 9/2014 | Boardman et al. | |
| 2015/0285505 A1 * | 10/2015 | Stevenson | F23R 3/34 60/725 |

OTHER PUBLICATIONS

Spoor et al., "Mode-locking of acoustic resonators and its application to vibration cancellation in acoustic heat engines," Condensed Matter and Thermal Physics Group, Los Alamos National Laboratory, Los Alamos, New Mexico, Feb. 10, 1999, 10 pgs.
U.S. Appl. No. 14/171,001, filed Feb. 3, 2014, Crothers et al.
U.S. Appl. No. 14/192,687, filed Feb. 27, 2014, Crothers et al.
U.S. Appl. No. 14/207,041, filed Mar. 12, 2014, Crothers et al.
U.S. Appl. No. 14/276,700, filed May 13, 2014, Crothers et al.
U.S. Appl. No. 14/249,158, filed Apr. 9. 2014, Ziminsky et al.
U.S. Appl. No. 14/248,194, filed Apr. 8, 2014, Stevenson et al.
U.S. Appl. No. 12/288,875, filed May 28, 2014, Crothers et al.
U.S. Appl. No. 14/288,974, filed May 28, 2014, Crothers et al.
U.S. Appl. No. 14/659,399, filed Mar. 16, 2015, DiCintio et al.
U.S. Appl. No. 14/048,252, filed Oct. 8, 2013, Crothers et al.
U.S. Appl. No. 14/249,158, filed Apr. 9, 2014, Ziminsky et al.
U.S. Appl. No. 14/170,702, filed Feb. 3, 2014, Day et al.
U.S. Appl. No. 14/170,710, filed Feb. 3, 2014, Carnell Jr. et al.
U.S. Appl. No. 14/170,716, filed Feb. 3, 2014, Crothers et al.
U.S. Appl. No. 14/170,729, filed Feb. 3, 2014, Crothers et al.
U.S. Appl. No. 14/170,738, filed Feb. 3, 2014, Crothers et al.
U.S. Appl. No. 14/154,925, filed Jan. 14, 2014, Aphale et al.

* cited by examiner

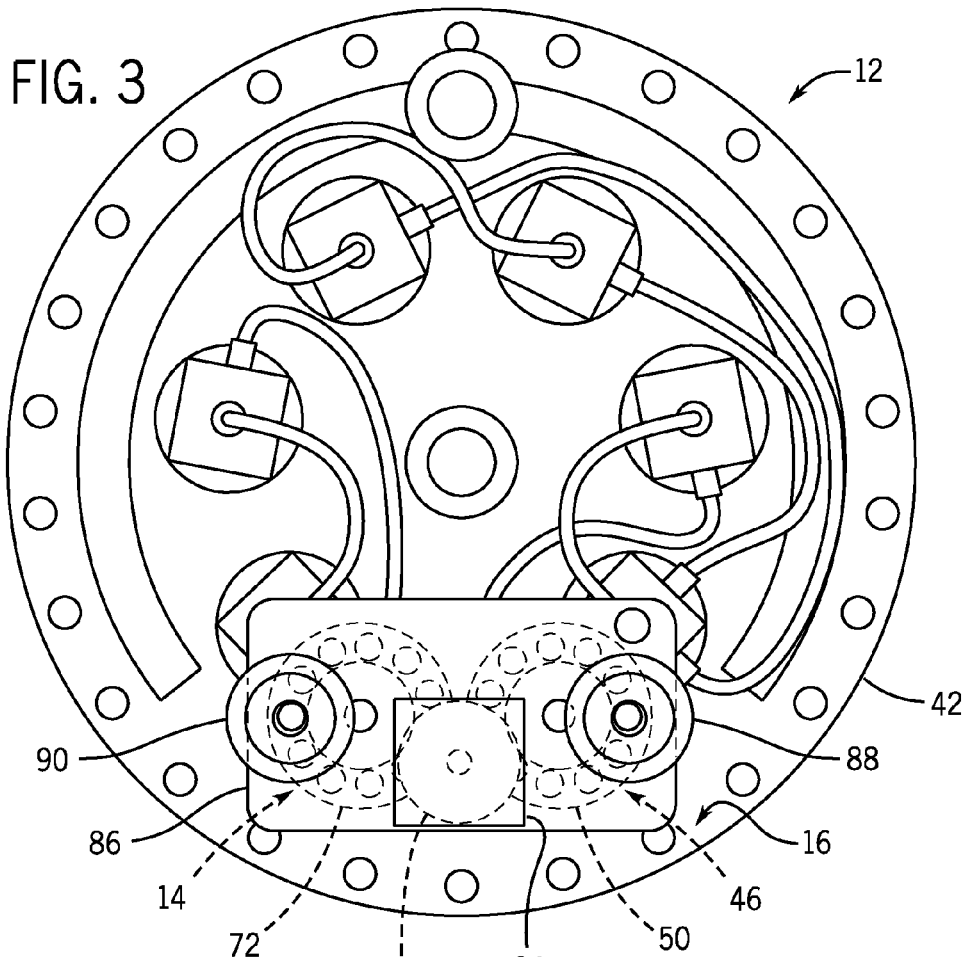
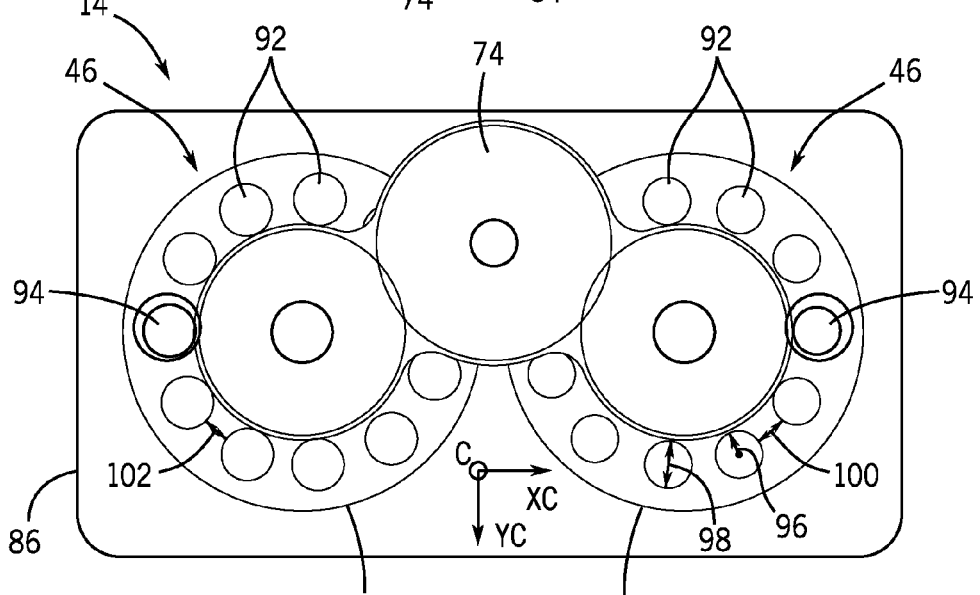

SYSTEMS AND METHODS FOR A FUEL PRESSURE OSCILLATION DEVICE FOR REDUCTION OF COHERENCE

BACKGROUND

The subject matter disclosed herein relates to systems and methods for reducing modal coupling of combustion dynamics. In particular, the system and methods may be incorporated into a gas turbine or other turbomachine.

Gas turbine systems generally include a gas turbine engine having a compressor section, a combustor section, and a turbine section. The combustor section may include one or more combustors (e.g., combustion cans), each combustor having a primary combustion zone. A fuel and/or fuel-air (e.g., oxidant) mixture may be routed into the primary combustion zone through fuel nozzles, and the combustion zone may be configured to combust the mixture of the fuel and oxidant to generate hot combustion gases that drive one or more turbine stages in the turbine section.

The generation of the hot combustion gases can create combustion dynamics, which occur when the flame dynamics (also known as the oscillating component of the heat release) interact with, or excite, one or more acoustic modes of the combustor, to result in pressure oscillations in the combustor. For example, one mechanism of combustion instabilities may occur when the acoustic pressure pulsations cause a mass flow fluctuation at a fuel port which then results in a fuel-air ratio fluctuation in the flame zone. When the resulting fuel/air ratio fluctuation (e.g., heat release oscillation) and the acoustic pressure oscillations have a certain phase behavior (e.g., in-phase), a self-excited feedback loop results.

Combustion dynamics can occur at multiple discrete frequencies or across a range of frequencies, and can travel both upstream and downstream relative to the respective combustor. For example, the pressure waves may travel downstream into the turbine section, e.g., through one or more turbine stages, or upstream into the fuel system. Certain downstream components of the turbine section can potentially respond to the combustion dynamics, particularly if the combustion dynamics generated by the individual combustors exhibit an in-phase and coherent relationship with each other, and have frequencies at or near the natural or resonant frequencies of the components. In general, "coherence" refers to the strength of the linear relationship between two dynamic signals, and is strongly influenced by the degree of frequency overlap between them. In certain embodiments, "coherence" can be used as a measure of the modal coupling, or combustor-to-combustor acoustic interaction, exhibited by the combustion system.

Accordingly, a need exists to control the combustion dynamics, and/or modal coupling of the combustion dynamics and/or the combustor-to-combustor phase of the combustion dynamics, to reduce the possibility of any unwanted sympathetic vibratory response (e.g., resonant behavior) of components in the turbine system.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gas turbine engine. The gas turbine engine includes a first combustor comprising a first fuel nozzle, a second combustor comprising a second fuel nozzle, and a first fuel pressure oscillation system. The first fuel pressure oscillation system includes a first rotary device coupled to a first fuel circuit. The first fuel circuit is disposed along a first fuel passage leading to the first fuel nozzle. The first rotary device is configured to generate a first fuel pressure oscillation within the first fuel nozzle. The gas turbine engine also includes a second fuel pressure oscillation system having a second rotary device coupled to a second fuel circuit. The second fuel circuit is disposed along a second fuel passage leading to the second fuel nozzle, and the second rotary device is configured to generate a second fuel pressure oscillation within the second fuel nozzle.

In a second embodiment, a system includes a first combustor having a first fuel circuit with a first fuel nozzle, a second fuel circuit having a second fuel nozzle, and a first fuel pressure oscillation system disposed upstream of the first fuel nozzle and the second fuel nozzle. The first fuel pressure oscillation system is configured to generate pressure oscillations within a fuel. The first fuel pressure oscillation system comprises a first rotary device disposed along a first fuel passage of the first fuel circuit and leading to the first fuel nozzle, a second rotary device disposed along a second fuel passage of the second fuel circuit and leading to the second fuel nozzle, and a first drive coupled to a first gear, wherein the first gear is configured to provide a rotational force that rotates the first rotary device and the second rotary device.

In a third embodiment, a method includes providing a fuel to a first rotary device of a fuel pressure oscillation system. The first rotary device is disposed along a first fuel passage of a first fuel circuit leading to a first fuel nozzle of a combustor, and the first rotary device comprises a first plurality of orifices. The method also includes providing the fuel to a second rotary device of the fuel pressure oscillation system. The second rotary device is disposed along a second fuel passage of a second fuel circuit leading to a second fuel nozzle of the combustor, and the second rotary device comprises a second plurality of orifices. The method also includes rotating the first rotary device and the second rotary device of the fuel pressure oscillation system, and pulsing the fuel through the first plurality of orifices of the first rotary device to generate a first fuel pressure oscillation. The method also includes pulsing the fuel through the second plurality of orifices of the second rotary device to generate a second fuel pressure oscillation. The first fuel pressure oscillation is different from the second fuel pressure oscillation.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein:

FIG. 3 is a schematic of an embodiment of an end cover of the combustor of FIG. 2, illustrating a drive motor and a housing configured to enclose one or more spinning disks of the fuel pressure oscillation system; and FIG. 4 is a schematic of an embodiment of the housing of the fuel pressure oscillation system of FIG. 3.

DETAILED DESCRIPTION

Figure 1:
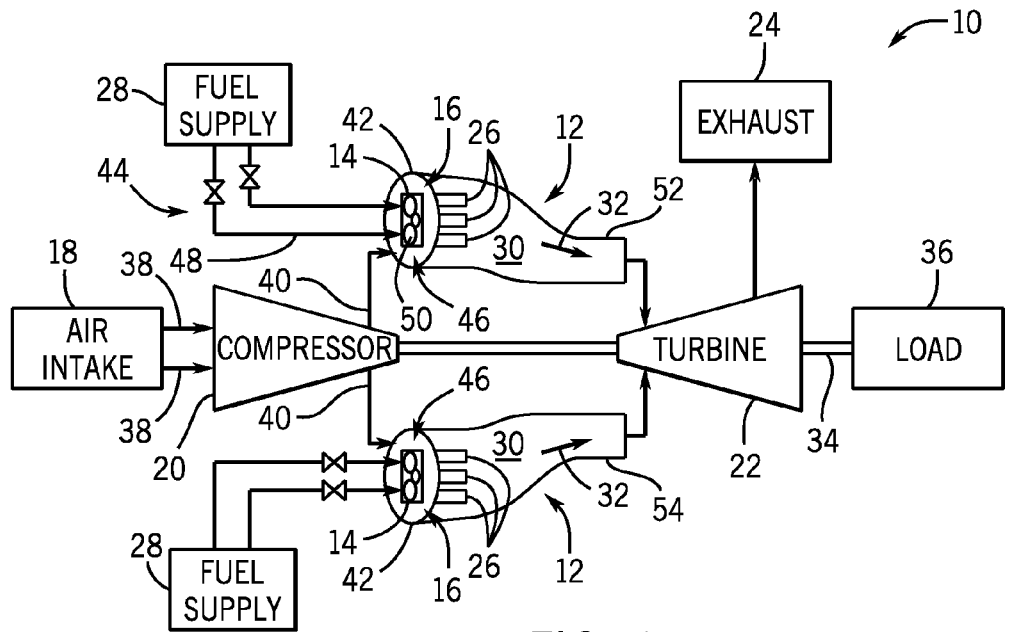
FIG. 1 is a schematic of an embodiment of a gas turbine system having a plurality of combustors, where each combustor of the plurality of combustors is equipped with a fuel pressure oscillation system.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed towards reducing combustion dynamics and/or modal coupling of combustion dynamics and/or altering the combustor-to-combustor phase delay of the combustion dynamics, to reduce unwanted vibratory responses in downstream components in a gas turbine system, and/or the combustors themselves. As described above, a combustor within the gas turbine system combusts oxidant-fuel mixtures to generate hot combustion gases that drive one or more turbine stages in the gas turbine. In some situations, the combustion system may create combustion dynamics due to the combustion process, characteristics of intake fluid flows (e.g., fuel, oxidant, diluent, etc.) into the combustor, and various other factors. At particular operating conditions, combustion dynamics at specific frequencies and with sufficient amplitudes, which are in-phase and coherent, may produce undesirable sympathetic vibrations in the turbine section and/or other downstream components. For example, the combustion dynamics (e.g., at certain frequencies, ranges of frequencies, amplitudes, combustor-to-combustor phases, etc.) can travel downstream in the gas turbine system. If the gas turbine combustors, and/or downstream components have natural or resonant frequencies that are driven by these pressure fluctuations (i.e. combustion dynamics), then the pressure fluctuations can potentially cause vibration, stress, fatigue, etc. The components may include turbine nozzles, turbine blades, turbine shrouds, turbine wheels, bearings, fuel supply assemblies, or any combination thereof. The downstream components are of specific interest, as they are more sensitive to combustion tones that are in-phase and coherent. Thus, reducing coherence and/or increasing combustor-to-combustor phase (e.g., more out of phase), specifically reduces the possibility of unwanted vibrations in downstream components.

With the foregoing in mind, various embodiments of the present disclosure include a system and method for reducing modal coupling of combustion dynamics and/or increasing combustor-to-combustor phase via one or more fuel pressure oscillation systems. In particular, a gas turbine system may include multiple combustors, and each combustor may include a fuel pressure oscillation system configured upstream from an end cover of the combustor and operatively coupled to one or more fuel circuits. The fuel pressure oscillation system may be configured to cause pressure oscillations and/or pressure modulations of the fuel flowing through the head end of the combustor to one or more fuel nozzles. In turn, oscillating the fuel pressure is expected to cause fuel flow oscillations through the combustors. In some situations, varying the pressure oscillations and/or the pressure modulations of the fuel flow through the fuel nozzles within a particular combustor and/or among one or more combustors may be known as "dithering." The timing and amplitude of the fuel pressure oscillations may be random, scheduled, and/or in response to one or more of the amplitude, phase, coherence, and/or frequencies of the combustion instabilities generated by the combustion system. Accordingly, the fuel pressure oscillation systems may vary the frequency relationship between two or more combustors to reduce the coherence of the combustion system as a whole, and is expected to help to reduce any combustor-to-combustor coupling. Alternatively, the fuel pressure oscillation systems are expected to vary the combustor-to-combustor phase of the combustion dynamics. As a result, the fuel pressure oscillation systems are expected to reduce the ability of the combustor tone to cause vibratory responses within downstream components of the system, and/or within the combustors themselves.

In certain embodiments, a fuel pressure oscillation system may be operatively coupled to one or more fuel circuits of a particular combustor of the gas turbine system and may oscillate the pressure, and therefore the fuel flow through the fuel nozzles of the one or more fuel circuits, which may, in turn, oscillate the fuel nozzle pressure ratios and/or equivalence ratios of the fuel nozzles of the one or more fuel circuits. A change in the fuel nozzle pressure ratio and/or equivalence ratio, resulting from differences in the fuel flow rate to a given fuel nozzle or group of fuel nozzles, may directly affect the combustion instability frequency and/or amplitude in the particular combustor. In such embodiments, the fuel pressure oscillation system may be configured to oscillate (e.g., vary) the fuel nozzle pressure ratio and/or equivalence ratio, thereby oscillating the frequencies of the combustor Oscillating the frequencies of a particular combustor is expected to reduce coherence by driving the frequencies of the particular combustor away from that of the other combustors. Alternatively, oscillating the fuel flow through a particular combustor can be expected to alter the phase relationship between that combustor and the other combustors.

In other embodiments, a group of combustors, every other combustor, or each combustor within the system may be configured with a fuel pressure oscillation system. Oscillating the fuel flow with a time lag between or among the combustors introduces a phase delay in the fuel pressure oscillations among the combustors, which is expected to decrease coherence due to the increase in frequency variation among the combustors. In such embodiments, as the fuel pressure oscillates through the fuel nozzles, the fuel nozzle pressure ratio, and therefore the combustion dynamics frequency, oscillates. If there is a time delay between the frequency oscillations of a particular combustor and at least one other combustor, then the frequencies will be different between the combustors at any given instant of time, except for the point at which the oscillating waveforms cross (e.g., the waveform in a particular combustor is decreasing in fuel nozzle pressure ratio, while the waveform in another combustor is increasing in fuel nozzle pressure ratio), resulting in increased combustion dynamics frequency variation among the combustors. To maximize coherence disruption, the fuel pressure oscillation system associated with each combustor (or each group of combustors) may oscillate the fuel pressure, and therefore the frequency, in such a way as to oscillate the combustion dynamics frequencies in a particular combustor, or particular group of combustors, opposite in phase compared to at least one other combustor, or group of combustors. In other words, maximum coherence disruption would occur when the combustion dynamics frequency passes through a maximum in one combustor at the same time that it passes through a minimum in another combustor.

Alternatively, oscillating the fuel flow through the fuel nozzles of one or more fuel circuits of one or more combustors may alter the phase relationship of the combustion dynamics among the combustors. Introducing a time delay in the fuel flow oscillation between two or more combustors may increase the phase delay between the combustors, altering the combustor-to-combustor phase relationship. Specifically, oscillating the fuel pressure out of phase between and/or among combustors may increase the combustor-to-combustor phase delay of an otherwise "in-phase" tone. It is well-documented that controlling the phase of the fuel pressure oscillation with respect to that of the combustion dynamics within a combustor (or a combustion system) can be effective in reducing combustion dynamics amplitudes, by altering the phase between the heat release (e.g., flame dynamics) and the combustor acoustic oscillations. However, controlling the phase of fuel pressure oscillations among combustors to be out-of-phase is expected to produce the additional benefit of controlling combustor-to-combustor phase, by altering the phase of the heat release (flame dynamics) from combustor-to-combustor. Maximum combustor-to-combustor phase is expected to occur when the frequency of fuel pressure oscillation is near the frequency of the combustion dynamics tone of interest (or that of a sub-harmonic frequency), and the fuel pressure oscillation is out of phase among the combustors. Since downstream turbine components are more sensitive to in-phase, coherent tones, disrupting the coherence and/or increasing the combustor-to-combustor phase among combustors, can be expected to reduce unwanted vibratory response in components downstream from the combustion system. As a result, various embodiments of the present invention are expected to reduce the ability of the combustor tone to cause a vibratory response in downstream components.

With the foregoing in mind, FIG. 1 is a schematic of an embodiment of a gas turbine system 10 having a plurality of combustors 12, wherein each combustor 12 is equipped with a fuel pressure oscillation system 14 (e.g., spinning disk system 14, rotary devices or structures, reciprocating structures, vibrating structures, etc.) operatively coupled to an end cover 42 of the combustor 12.

As illustrated, the gas turbine system 10 includes an air intake 18, a compressor 20, a turbine 22, and an exhaust 24. The gas turbine system 10 includes one or more combustors 12 having a plurality of fuel nozzles 26 (e.g., 1, 2, 3, 4, 5, 6, 7, 8, 9, 10 or more fuel nozzles 26), which route a fuel 28, such as a liquid fuel and/or a gas fuel into the combustors 12 for combustion within a primary combustion zone 30. The combustors 12 ignite and combust an oxidant-fuel mixture, and then hot combustion gases 32 are passed into the turbine 22. The turbine 22 includes turbine blades that are coupled to a shaft 34, which is also coupled to several other components throughout the system 10. As the combustion gases 32 pass through the turbine blades in the turbine 22, the turbine 22 is driven into rotation, which causes the shaft 34 to rotate. Eventually, the combustion gases 32 exit the turbine system 10 via the exhaust outlet 24. Further, the shaft 34 may be coupled to a load 36, which is powered via rotation of the shaft 34. For example, the load 36 may be any suitable device that may generate power via the rotational output of the turbine system 10, such as an external mechanical load. For instance, the load 36 may include an electrical generator, the propeller of an airplane, and so forth.

In an embodiment of the turbine system 10, compressor blades are included as components of the compressor 20. The blades within the compressor 20 are coupled to the shaft 34, and will rotate as the shaft 34 is driven to rotate by the turbine 22, as described above. The rotation of the blades within the compressor 20 compress air (or any suitable oxidant) 38 from the air inlet 18 into pressurized air 40 (e.g., pressurized oxidant). The pressurized oxidant 40 is then fed into the fuel nozzles 26 of the combustors 12. The fuel nozzles 26 mix the pressurized oxidant 40 with the fuel 28 to produce a suitable mixture ratio for combustion (e.g., a combustion that causes the fuel to more completely burn) so as not to waste fuel or cause excess emissions.

In certain embodiments, the combustor 12 of the system 10 may be operatively coupled to the fuel pressure oscillation system 14. The fuel pressure oscillation system 14 may be operatively coupled to an endcover 42 of the combustor 12, and receives the fuel 28 via one or more fuel circuits 44. In certain embodiments, each fuel circuit 44 may be associated with, and may be configured to provide the fuel 28 to one or more fuel nozzles 26. In particular, the fuel pressure oscillation system 14 may include one or more spinning disks 46 (e.g., rotary devices, rotary structures, reciprocating structures, vibrating structures, etc.) configured to cause pressure oscillations of the fuel 28 flowing through the endcover 42. In certain embodiments, each spinning disk 46 of the fuel pressure oscillation system 14 may be associated with the fuel circuit 44 and the one or more fuel nozzles 26 associated with that fuel circuit 44. For example, in the illustrated embodiment, a first fuel circuit 48 may be configured to provide the fuel 28 to one or more fuel nozzles 26 and may be associated with a first spinning disk 50 of the fuel pressure oscillation system 14. Further, the first spinning disk 50 may be configured to cause pressure oscillations of the fuel 28 flowing from the first fuel circuit 48 to the one or more fuel nozzles 26 associated with the first fuel circuit 48. A second spinning disk 72 may be configured to cause pressure oscillations of the fuel 28 flowing from the second fuel circuit 68 to the one or more fuel nozzles 26 associated with the second fuel circuit 68. The second spinning disk 72 may be configured to cause fuel pressure oscillations that are out of phase (e.g., delayed in time) relative to the first spinning disk 50, such that the total fuel flow through the combustor 12 is kept approximately constant through time.

In certain embodiments, a group of combustors 12, adjacent combustors 12, every other combustor 12, or each combustor 12 within the system 10 may be configured with the fuel pressure oscillation system 14. In such embodiments, to maximize coherence disruption and/or maximize the phase delay among combustors 12, the fuel pressure oscillation system 14 associated with one or more combustors 12 (or one or more group of combustors 12) may oscillate the fuel pressure through the fuel nozzles 26 of that combustor 12 (or group of combustors 12) out of phase relative to the fuel pressure through the fuel nozzles 26 of another combustor 12 (or another group of combustors 12). For example, in the illustrated embodiment, the fuel pressure oscillation system 14 of a first combustor 52 may cause pressure oscillations of the fuel 28, so that the resulting combustion dynamics frequencies of the first combustor 52 oscillate out of phase relative to a second combustor 54. Indeed, as the combustion dynamics frequency of the first combustor 52 varies differently through time compared to the second combustor 52 (eg. the frequency passes through a maximum in the first combustor 52 at the same time as the frequency passes through a minimum in the second combustor 54), the variation in combustion dynamics frequencies among the combustors may increase, which is expected to reduce coherence. Alternatively, oscillating the fuel flow through the combustors such that the fuel flow oscillates in the first combustor 52 out of phase compared to the second combustor 54, may cause the phase delay of the combustion dynamics between the first combustor 52 and the second combustor 54, to increase, particularly (but not exclusively) when the fuel pressure oscillation frequency is near the frequency of the combustion instability of interest.

As a further example, a group of combustors 12, where each group comprises one or more combustors 12, may be equipped with a fuel pressure oscillation system 14 that varies in configuration relative to the fuel pressure oscillation system 14 of another combustor 12. For instance, the fuel pressure oscillation system 14 of one combustor 12 may vary from the fuel pressure oscillation system 14 of another combustor in terms of one or more of the frequency of the oscillation that it generates, the amplitude of the oscillation that it generates and/or the time delay (e.g., phase) of the oscillation that it generates.

Furthermore, it should be noted that in certain embodiments, a single fuel pressure oscillation system 14 may be utilized for one or more combustors 12 (or one or more groups of combustors 12) of the gas turbine system 10. For example, a global machine-level fuel pressure oscillation system 14 may be configured to receive the fuel 28 and cause pressure oscillations of the fuel 28 before providing the fuel 28 to each combustor 12 of the system 10.

Figure 2:
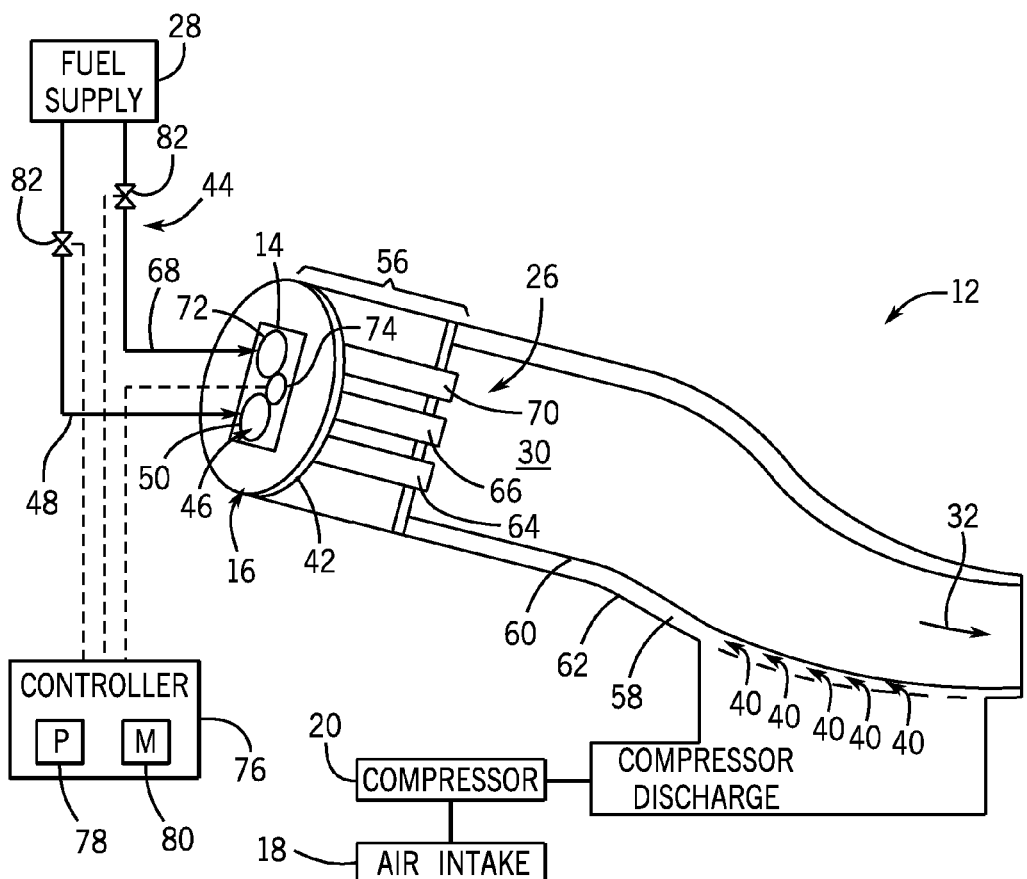
FIG. 2 is a cross-sectional schematic of an embodiment of one of the combustors of FIG. 1, where the combustor is operably coupled to the fuel pressure oscillation system and a controller.

FIG. 2 is a schematic of an embodiment of one of the combustors 12 of FIG. 1, where the combustor 12 is operatively coupled to the fuel pressure oscillation system 14 (e.g., spinning disk device 14). The combustor 12 includes the head end 16 having the endcover 42, a combustor cap assembly 56, and the primary combustion zone 30. The end cover 42 and the combustor cap assembly 56 may be configured to support the primary fuel nozzles 26 in the head end 16. In the illustrated embodiment, the primary fuel nozzles 26 route the fuel 28 to the primary combustion zone 30. Further, the fuel nozzles 26 receive the pressurized oxidant (e.g., pressurized air) 40 from the annulus 58 (e.g., between liner 60 and flow sleeve 62) of the combustor 12 and combine the pressurized oxidant 40 with the fuel 28 to form an oxidant/fuel mixture that is ignited and combusted in the primary combustion zone 30 to form combustion gases 32 (e.g., exhaust), which flow to the turbine 22.

As described above, combustion dynamics within the primary combustion zone 30 may lead to unwanted vibratory responses in downstream components, and in the combustors themselves. Accordingly, it may be beneficial to control the combustion dynamics, and/or the modal coupling of the combustion dynamics and/or the phase of the combustion dynamics among various combustors 12 of the system 10, to help reduce the possibility of any unwanted sympathetic vibratory responses (e.g., resonant behavior) of components within the system 10.

As noted above with respect to FIG. 1, the combustor 12 of the system 10 may be configured with the fuel pressure oscillation system 14. The fuel pressure oscillation system 14 may be disposed on the endcover 42 of the combustor 12, and may receive the fuel 28 via one or more fuel circuits 44. In certain embodiments, each fuel circuit 44 may be associated with, and may be configured to provide the fuel 28 to one or more fuel nozzles 26. For example, the first fuel circuit 48 may be configured to provide the fuel 28 to a first fuel nozzle 64 and a second fuel nozzle 66. Likewise, a second fuel circuit 68 may be configured to provide the fuel 28 to a third fuel nozzle 70. In addition, the fuel pressure oscillation system 14 may include one or more spinning disks 46 (e.g., rotary devices, rotary structures, reciprocating structures, vibrating structures, etc.) configured to cause pressure oscillations of the fuel 28, flowing through the endcover 42. In certain embodiments, each spinning disk 46 of the fuel pressure oscillation system 14 may be associated with the fuel circuit 44 and the one or more fuel nozzles 26 associated with that fuel circuit 44. Accordingly, a first spinning disk 50 may cause pressure oscillations of the fuel 28 provided by the first fuel circuit 48 to the first and the second fuel nozzles 64 and 66, respectively. Likewise, a second spinning disk 72 may cause pressure oscillations of the fuel 28 provided by the second fuel circuit 68 to the third fuel nozzle 70. In particular, the fuel pressure oscillation system 14 may be configured to oscillate the fuel 28 such that the pressure oscillations of the fuel 28, and therefore the fuel flow oscillations through the third fuel nozzle 70 are different than, and out of phase relative to, the first fuel nozzle 64 and second fuel nozzle 66.

In certain embodiments, the fuel pressure oscillation system 14 includes a drive motor 84 (depicted in FIG. 3) configured to drive the rotation of one or more spinning disks 46 via one or more gears 74. For example, the gear 74 may be a central disk that is configured to operatively engage the first spinning disk 50 and the second spinning disk 72 into rotation. In particular, the one or more gears 74 may be used to drive multiple spinning disks 46 with one drive motor, and may be configured to transfer the rotary motion to the spinning disks 46 from a drive motor 84 (depicted in FIG. 3). As noted above, as the first spinning disk 50 and the second spinning disk 72 rotate, the fuel 28 may be pulsed through the spinning disks 46 to cause pressure oscillations, and therefore fuel flow oscillations, of the fuel 28. While the illustrated embodiment depicts the fuel pressure oscillation system 14 with two spinning disks 46 and one gear 74, it should be noted that in other embodiments, any number of spinning disks 46 (e.g., 1, 3, 4, 5, 6, or more) and gears 74 (e.g., 2, 3, 4, 5 or more) may be utilized in different configurations. Alternatively, or in addition, each spinning disk 46 may have a drive motor, such that there are no gears 74 in the system.

In certain embodiments, a controller 76 having a processor 78 and a memory 80 may be utilized to remotely and/or automatically control components of the system 10. For example, the controller 76 may be utilized to control the drive motor operatively coupled to the gears 74 or to control one or more fuel valves 82 of the fuel circuits 44. The processor 78 may generally be any suitable processing device known in the art, and may include a memory 80 for storing instructions executable by the processor 78. The memory 80 may generally be any suitable computer-readable medium or media, including, but not limited to, RAM, ROM, hard drives, flash drives, or other memory devices. As is generally understood, the memory 80 may be configured to store information accessible by the processor 78, including instructions that can be executed by the processor 78. The instructions may be any set of instructions that when executed by the processor 78 causes the processor 78 to provide the desired functionality. For instance, the instructions can be software instructions rendered in a computer-readable form. When software is used, any suitable programming, scripting, or other type of language or combinations of languages may be used to implement the teachings contained herein. Alternatively, the instructions can be implemented by hard-wired logic or other circuitry, including, but not limited to application-specific circuits.

In certain embodiments, the controller 76 may be configured to regulate the timing (e.g., phase among multiple spinning disks 46 and/or fuel pressure oscillation systems 14), frequency, and/or the amplitudes of fuel pressure oscillations of the fuel 28 generated by the fuel pressure oscillation system 14. For example, the controller 76 may be configured to control the rotational speed of the spinning disks 46 via the drive motor, thereby regulating the amplitude and frequency of fuel pressure oscillations generated within the fuel 28. In other embodiments, the timing and/or the amplitude of fuel pressure oscillations of the fuel 28 may be random, scheduled, and/or in response to sensor feedback indicative of one or more of the amplitude, phase, coherence, and/or frequencies of the combustion instabilities of the combustion system. Further, it should be noted that while the controller 76 is depicted as operatively coupled to a single fuel pressure oscillation system 12, in other embodiments, the controller 76 may be operatively coupled to one or more fuel pressure oscillations systems 12 operatively coupled one or more fuel circuits 44 associated with one or more combustors 12 of the system 10.

FIG. 3 is a view of an embodiment of the head end 16 of the combustor 12 of FIG. 2, illustrating a drive motor 84 and a housing 86 configured to enclose one or more spinning disks 46 of the fuel pressure oscillation system 14. In particular, the fuel pressure oscillation system 14 may be operatively coupled to the combustor 12 upstream of the endcover 42. In certain embodiments, incorporating the fuel pressure oscillation system 14 upstream of the endcover 42 may allow the pre-orifice of the endcover 42 to be incorporated into the fuel pressure oscillation system 14, thereby removing the pre-orifice from the endcover 42. In other words, the spinning disks 46 of the fuel pressure oscillation system 14 may be configured to act as the pre-orifices configured to receive the fuel 28 from the fuel supply.

In certain embodiments, the fuel 28 enters each spinning disk 46 via one or more piping attachments or pigtail connectors. For example, the first spinning disk 50 may be coupled to a first pigtail connector 88, which may be configured to receive the fuel 28 from the first fuel circuit 48. Likewise, the second spinning disk 72 may be coupled to a second pigtail connector 90, which may be configured to receive the fuel 28 from the second fuel circuit 68. It should be noted that in other embodiments, any number of spinning disks 46 may be configured within the housing 86, and may be configured to receive the fuel 28 from any number of fuel circuits 44.

Once the fuel 28 enters the fuel pressure oscillation system 14, the drive motor 84 may engage the gears 74 to rotate the spinning disks 46 and cause pressure oscillations of the fuel 28 flowing through the endcover 42. In particular, as the fuel 28 flows through one or more orifices on the spinning disks 46, the fuel 28 is pulsed and pressure oscillations are caused, as further described with respect to FIG. 4. In particular, as noted above, the rotation of the spinning disks 46 may be regulated, scheduled, and/or timed such that the pressure oscillations caused by the first spinning disk 50 may be varied from the pressure oscillations caused by the second spinning disk 72. For example, the orifices on the spinning disks 46 may be sized, spaced or disposed in a manner that facilitates generating pressure oscillations of the fuel 28 within the first fuel circuit 44 that are out of phase relative to the pressure oscillations of the fuel 28 within the second fuel circuit 68, as further described with respect to FIG. 4. Further, the controller 76 may be configured to regulate the rotational speed of the spinning disks 46 via the drive motor 84 to control the generation of the pressure oscillations within each fuel circuit 44. After the fuel 28 is pulsed and pressure oscillations are generated within the fuel flow such that they are generally out of phase between each fuel circuit 44, the fuel 28 exits the fuel pressure oscillation system 14 via the end cover 42 and the fuel 28 may be routed to the appropriate fuel nozzles 26. In this manner, the pressure oscillations of the fuel 28 through one or more fuel nozzles 26 may be out of phase relative to the pressure oscillations of the fuel 28 through another fuel nozzle 26. Accordingly, as noted above, generating fuel pressure oscillations within the fuel circuits 44 to be out of phase relative to one another may approximately maintain the total fuel flow through the combustor through time.

Furthermore, in other embodiments, to maximize coherence disruption and/or to maximize the combustor-to-combustor phase difference, the fuel pressure oscillation systems 14 associated with one or more combustors 12 (or one or more groups of combustors 12) may oscillate the fuel pressure through the fuel nozzles 26 associated with a particular fuel circuit 44 out of phase relative to the fuel pressure oscillations through the fuel nozzles 26 associated with the same fuel circuit 44 in other combustors 12 (or groups of combustors 12). As the fuel pressure oscillates through the fuel nozzles 26 associated with a particular fuel circuit 44 of one or more combustors 12 such that the fuel pressure oscillation is out of phase with that of the fuel nozzles associated with the same fuel circuit 44 of the other combustors 12 within the system 10, the frequency of the one or more combustors 12 oscillates out of phase compared to other combustors 12 within the system 10. In other words, when the fuel pressure is oscillated opposite in phase in the first combustor 52 (or first group of combustors) compared to a second combustor 54 (or second group of combustors), the frequency will be at a maximum in the first combustor 52 (or first group of combustors), at the same time that the frequency will be a minimum in the second combustor 54 (or second group of combustors), which will result in combustor tone frequencies being separated combustor-to-combustor within the system 10, thereby reducing the coherence of the system 10 as a whole, which is expected to reduce modal coupling of the combustion dynamics. Alternatively, as the fuel pressure oscillates through the fuel nozzles 26 associated with a particular fuel circuit 44 of the first combustor 52 (or first group of combustors) such that the fuel pressure oscillations are out of phase with fuel pressure oscillations of the fuel nozzles 26 associated with the same fuel circuit 44 of a second combustor 54 (or second group of combustors) within the system 10, the combustor-to-combustor phase may be altered, thereby reducing any unwanted vibratory responses of downstream components.

FIG. 4 is a schematic of an embodiment of the housing 86 of the fuel pressure oscillation system 14 of FIG. 3, illustrating a plurality of orifices 92 disposed on the spinning disks 46. As noted above, the spinning disks 46 may be disposed within the housing 86, which may be a sealed enclosure configured to retain the fuel 28 supplied by the one or more fuel circuits 44. The one or more gears 74 may also be disposed within the housing 86, and may be operatively coupled to a drive motor 84 which may be disposed within and/or external to the housing 86. As noted above, the drive motor 84 may be configured to drive the gear 74, thereby providing a rotational speed to the one or more spinning disks 46 of the fuel pressure oscillation system 14. While the depicted embodiment illustrates two spinning disks 46 and the single gear 74 disposed in between, in other embodiments, any number of spinning disks 46 (e.g., 1, 3, 4, 5, 6, 7, or more) may be disposed within the housing 86 and an appropriate number of gears 74 may be utilized to transfer rotary motion from a single drive motor 84 to the multiple spinning disks 46. In certain embodiments, one or more drive motors 84 may be utilized to generate the rotary motion.

In particular, a plurality of orifices 92 may be disposed on the spinning disks 46. As the fuel 28 enters each spinning disk 46 through a fuel inlet 94, the rotating disks 46 pulse the fuel 28 as it flows through the orifices 92. The orifices 92 may be configured to be any size (e.g., an effective area, a radius 96, a circumference 98, a length, a width, a depth, a position, etc.) or shape (e.g., circular, rectangular, triangular, oval, oblong, etc.), and may be disposed on the spinning disks 46 in a wide variety of patterns and in a wide variety of spacings. For example, in certain embodiments, the orifices 92 of the first spinning disk 50 may be circular, while the orifices 92 of the second spinning disk 72 may be a different shape (e.g., rectangular, triangular, oval, oblong, etc.). As a further example, the orifices 46 may be different sizes, such that the size of the orifices 92 of the first spinning disk 50 may be greater than or less than the size of the orifices 92 of the second spinning disk 72.

In particular, the orifices 92 may be disposed on the spinning disks 46 with a wide variety of patterns (e.g., random, circularly arranged, matrix, etc.), and may be positioned with different amounts of spacing in between any two orifices 92. For example, a first distance 100 between two orifices 92 on the first spinning disk 50 may be greater than or less than a second distance 102 between two orifices 92 on the second spinning disk 72. The spacing of the orifices 92 in combination with the orifice 92 geometry (size, shape, etc) and the rotational speed of the spinning disks 46 will affect the amplitude and frequency of the fuel pressure oscillation. In addition, the first and second spinning disks 50, 72 may be "clocked" relative to one another to influence the phasing of the fuel pressure oscillations generated by the first and second spinning disks 50, 72. For instance, the position of the orifices 92 of the first spinning disk 50 relative to the fuel inlet 94 of the first spinning disk 50 may be different compared to the position of the orifices 92 of the second spinning disk 50 relative to the fuel inlet 94 of the second spinning disk 50. The relative positioning of the orifices 92 on the spinning disks 46 may therefore facilitate regulating the phase control of the first fuel circuit 48 relative to the second fuel circuit 68. In this manner, as the fuel 28 is pulsed through the orifices 92, the size, shape, and relative positioning of the orifices 92 may facilitate driving the fuel pressure oscillations of the first fuel circuit 48 out of phase relative to the fuel pressure oscillations of the second fuel circuit 68, and or alter the frequency and/or amplitude of the fuel pressure oscillations of the first and/or second fuel circuit 48, 68.

Accordingly, the fuel pressure oscillation systems 14 may be configured with various geometrical differences such as, for example, the number of spinning disks 46, the number of gears 74, and/or the size, shape, or relative positioning of the orifices 92. In this manner, a wide variety of fuel pressure oscillation systems 14 may be formed and configured with the combustors 12 in order to achieve a desired variance in frequencies within the system 10, and/or a desired phase behavior among the combustors 12 within the system 10. For example, the fuel pressure oscillation system 14 operatively coupled to the first combustor 52 may have at least one geometrical difference that varies from the fuel pressure oscillation system 14 operatively coupled to the second combustor 54, thereby helping to reduce modal coupling between the first and second combustors 12, and/or helping to alter the phase behavior of the combustion dynamics between the first and second combustors 12. As a further example, the fuel pressure oscillation system 14 operatively coupled to a first group of combustors 12 (where each group comprises one or more combustors 12) may have at least one geometrical difference that varies from the fuel pressure oscillation system 14 operatively coupled to a second group of combustors 12, thereby helping to reduce modal coupling between the first and second groups of combustors 12, and/or helping to alter the phase behavior of the combustion dynamics between the first and second groups of combustors 12. As a further example, each combustor 12 of the system 10 may be configured with a single fuel pressure oscillation system 14, where each oscillation system 14 has at least one geometrical difference from another oscillation system 14 within the system, thereby helping to reduce modal coupling between the combustors 12 of the system 10, and/or helping to alter the phase behavior of the combustion dynamics between the combustors 12 of the system 10.

Technical effects of the invention include providing systems and methods for reducing modal coupling of combustion dynamics and/or altering the combustor-to-combustor phase behavior of combustion dynamics via one or more fuel pressure oscillation systems 14. In particular, the fuel pressure oscillation system 14 may be operatively coupled to one or more combustors 12, and may be configured to cause pressure oscillations and/or pressure modulations of the fuel 28 flowing through one or more fuel circuits 44 of the combustor 12 to the one or more fuel nozzles 26. In particular, the fuel pressure oscillation systems 14 may be configured to cause pressure oscillations within the different fuel circuits 44 and the fuel nozzles 26 associated with those fuel circuits 44, thereby causing the combustion dynamics frequency to vary, and/or causing the phase of the combustion dynamics to be altered relative to that of another combustor 12. In certain embodiments, a single combustor 12 may be equipped with the fuel pressure oscillation system 14. In other embodiments, a group of combustors 12, where each group comprises one or more combustors 12, may be equipped with the fuel pressure oscillation system 14. Further, in certain embodiments, each combustor 12 of the system 10 may be equipped with the fuel pressure oscillation system 14. In this manner, the combustion dynamics frequency may be varied within a single combustor 12 and/or among multiple combustors, reducing modal coupling of the combustion dynamics among the combustors 12. Alternately, or in addition to, the phase of the combustion dynamics among the combustors 12 may be altered. Reducing modal coupling and/or increasing the phase among the combustors 12 are expected to reduce unwanted vibratory response in downstream turbine components and/or in the combustors themselves.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gas turbine engine, comprising:
      a first combustor comprising a first fuel nozzle;
      a second combustor comprising a second fuel nozzle;
      a first fuel pressure oscillation system having a first rotary device coupled to a first fuel circuit configured to deliver fuel to the first fuel nozzle, wherein the first fuel circuit is disposed along a first fuel passage leading to the first fuel nozzle, and wherein the first rotary device comprises a first spinning disk and at least one orifice disposed within the first spinning disk, and wherein the first rotary device is configured to generate a first fuel pressure oscillation within the first fuel nozzle when the first fuel passes through the at least one orifice of the first spinning disk; and
      a second fuel pressure oscillation system having a second rotary device coupled to a second fuel circuit configured to deliver the fuel to the second fuel nozzle, wherein the second fuel circuit is disposed along a second fuel passage leading to the second fuel nozzle, and wherein the second rotary device comprises a second spinning disk and at least one orifice disposed within the second spinning disk, and wherein the second rotary device is configured to generate a second fuel pressure oscillation within the second fuel nozzle when the second fuel passes through the at least one orifice of the second spinning disk wherein at least one of the first and second combustors comprises an endcover and at least one of the first and second fuel nozzles axially extending away from the endcover.

2. The system of claim 1, wherein the first fuel pressure oscillation is different than the second fuel pressure oscillation, and the difference in fuel pressure oscillation is configured to help reduce modal coupling between the first combustor and the second combustor.

3. The system of claim 1, wherein the first fuel pressure oscillation is different than the second fuel pressure oscillation, and the difference in fuel pressure oscillation is configured to help alter a phase between the first combustor and the second combustor.

4. The system of claim 1, wherein a first plurality of orifices are disposed on the first spinning disk of the first rotary device and a second plurality of orifices are disposed on the second spinning disk of the second rotary device.

5. The system of claim 4, wherein a first geometry of the first plurality of orifices has at least one geometrical difference relative to a second geometry of the second plurality of orifices.

6. The system of claim 5, wherein the at least one geometrical difference is at least one of a different size, a different shape, a different dimension, a different effective area, or a different spacing, a different pattern, or any combination thereof.

7. The system of claim 1, wherein the gas turbine engine comprises a controller configured to control a first drive of the first rotary device, or a second drive of the second rotary device, or both, and wherein the first and second drives are configured to rotate the first and second spinning disks of the first and second rotary devices, respectively.

8. The system of claim 7, wherein the controller is configured to vary a first rotational speed of the first rotary device differently from a second rotational speed of the second rotary device.

9. A system, comprising: a first combustor, comprising: an endcover; a first fuel circuit comprising a first fuel nozzle axially extending away from the endcover; a second fuel circuit comprising a second fuel nozzle axially extending away from the endcover; and a first fuel pressure oscillation system disposed upstream of the first fuel nozzle and the second fuel nozzle, wherein the first fuel pressure oscillation system is configured to generate pressure oscillations within a fuel, and wherein the first fuel pressure oscillation system comprises: a first rotary device disposed along a first fuel passage of the first fuel circuit and leading to the first fuel nozzle; a second rotary device disposed along a second fuel passage of the second fuel circuit and leading to the second fuel nozzle; and a first drive coupled to a first gear, wherein the first gear is configured to provide a rotational force that rotates the first rotary device and the second rotary device.

10. The system of claim 9, wherein the first rotary device is configured to generate a first fuel pressure oscillation within the first fuel nozzle and the second rotary device is configured to generate a second fuel pressure oscillation within the second fuel nozzle.

11. The system of claim 10, wherein the first fuel pressure oscillation is different than the second fuel pressure oscillation, and the difference in fuel pressure oscillation is configured to help reduce modal coupling between the first combustor and a second combustor.

12. The system of claim 9, wherein the first fuel pressure oscillation is different than the second fuel pressure oscillation, and the difference in fuel pressure oscillation is configured to help alter a phase between the first combustor and a second combustor.

13. The system of claim 9, wherein the first rotary device comprises a first plurality of orifices and the second rotary device comprises a second plurality of orifices, and wherein the first and second plurality of orifices are configured to pulse the fuel as the fuel moves through the first and second fuel passages, respectively.

14. The system of claim 13, wherein the first plurality of orifices has at least one geometrical difference relative to the second plurality of orifices, and wherein the at least one geometrical difference is configured to generate a first fuel pressure oscillation of the first fuel nozzle that is out of phase from a second fuel pressure oscillation of the second fuel nozzle.

15. The system of claim 14, wherein the at least one geometrical difference is at least one of a different size, a different shape, a different dimension, a different effective area, or a different pattern, a different spacing, or any combination thereof.

16. The system of claim 9, wherein the system comprises a controller configured to control the first drive, thereby controlling the rotational speed of the first rotary device and the second rotary device.

17. A method, comprising: generating a first fuel pressure oscillation with a first rotary device of a fuel pressure oscillation system, wherein the first rotary device is disposed along a first fuel passage of a first fuel circuit leading to a first fuel nozzle of a combustor, wherein the first fuel nozzle axially extends away from an endcover of the combustor; and generating a second fuel pressure oscillation with a second rotary device of the fuel pressure oscillation system, wherein the second rotary device is disposed along a second fuel passage of a second fuel circuit leading to a second fuel nozzle of the combustor, wherein the second fuel nozzle axially extends away from the endcover of the combustor, and wherein the fuel pressure oscillation system disposed upstream of the first fuel nozzle and the second fuel nozzle, and wherein the fuel pressure oscillation system comprises a first drive coupled to a first gear, and wherein the first gear is configured to provide a rotational force that rotates the first rotary device and the second rotary device.

18. The method of claim 17, wherein the first rotary device comprises a first plurality of orifices, wherein the second rotary device comprises a second plurality of orifices, wherein the first plurality of orifices has at least one geometrical difference relative to the second plurality of orifices, and wherein the at least one geometrical difference is configured to generate a difference between the first fuel pressure oscillation and the second fuel pressure oscillation.

19. The method of claim 18, wherein the at least one geometrical difference is at least one of a different size, a different shape, a different dimension, a different effective area, a different spacing, or a different pattern, or any combination thereof.

20. The method of claim 17, comprising:
rotating the first rotary device and the second rotary device of the fuel pressure oscillation system;
pulsing fuel through a first plurality of orifices of the first rotary device to generate the first fuel pressure oscillation; and
pulsing fuel through a second plurality of orifices of the second rotary device to generate the second fuel pressure oscillation, wherein the first fuel pressure oscillation is different from the second fuel pressure oscillation.

* * * * *